US012602983B2

(12) United States Patent
Usui et al.

(10) Patent No.: US 12,602,983 B2
(45) Date of Patent: Apr. 14, 2026

(54) SYSTEM, METHOD AND STORAGE MEDIUM FOR VEHICLE INSPECTION AUTHORIZATION INFORMATION MANAGEMENT

(71) Applicant: HONDA MOTOR CO., LTD., Tokyo (JP)

(72) Inventors: Mana Usui, Tokyo (JP); Yutaka Kamata, Tokyo (JP); Gopinath Raja, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 18/590,796

(22) Filed: Feb. 28, 2024

(65) Prior Publication Data

US 2024/0296733 A1 Sep. 5, 2024

(30) Foreign Application Priority Data

Mar. 3, 2023 (JP) ................................. 2023-032813

(51) Int. Cl.
*G08B 21/18* (2006.01)
*G01C 21/36* (2006.01)
(Continued)

(52) U.S. Cl.
CPC ....... *G08B 21/182* (2013.01); *G01C 21/3626* (2013.01); *G06Q 10/1093* (2013.01); *H04W 4/02* (2013.01)

(58) Field of Classification Search
CPC .............. G08B 21/182; G01C 21/3626; G06Q 10/1095; G06Q 10/02; G06Q 50/40; H04W 4/02
See application file for complete search history.

(56) References Cited

U.S. PATENT DOCUMENTS 8,036,647 B2 10/2011 Matsumura et al.
2012/0242470 A1* 9/2012 Morgan ................ H04W 4/021
340/426.19
(Continued)

FOREIGN PATENT DOCUMENTS

JP 2003108821 A 4/2003
JP 2003317003 A 11/2003
(Continued)

OTHER PUBLICATIONS

Notice of Reasons for Refusal for Japanese Patent Application No. 2023-032813 dated Oct. 8, 2024; 4 pp.

*Primary Examiner* — Quan Zhen Wang
*Assistant Examiner* — Rajsheed O Black-Childress
(74) *Attorney, Agent, or Firm* — Armstrong Teasdale LLP

(57) ABSTRACT

A vehicle inspection authorization information management system comprises an authorized vehicle information creation unit which is configured to communicate with an inspecting user terminal possessed by an inspecting user who wishes to inspect an authorized vehicle and transmit vehicle information, a parking position, and a parking start time of the authorized vehicle to the inspecting user terminal, and an inspecting user detection unit which is configured to communicate with the inspecting user terminal to acquire a location of the inspecting user terminal from the inspecting user terminal and notify that the inspecting user is located near the authorized vehicle by transmitting a signal to an authorizing user terminal possessed by an authorized user who owns the authorized vehicle when a distance between the location of the inspecting user terminal and the parking position is equal to or less than a determination value.

6 Claims, 10 Drawing Sheets

(51) Int. Cl.
    *G06Q 10/1093*     (2023.01)
    *H04W 4/02*       (2018.01)

(56)           References Cited

U.S. PATENT DOCUMENTS

2012/0330696 A1 *  12/2012  Clark .................... G06Q 10/02
                                                      705/5
2017/0021760 A1 *   1/2017  Calnek ................... B60Q 1/482

FOREIGN PATENT DOCUMENTS

JP         2006318342 A    11/2006
JP         2020160848 A    10/2020
WO       2006134799 A1   12/2006

* cited by examiner

2min vehicle information cancel        guidance 12B          7B

7A

12A

SYSTEM, METHOD AND STORAGE MEDIUM FOR VEHICLE INSPECTION AUTHORIZATION INFORMATION MANAGEMENT

TECHNICAL FIELD

The present invention relates to a system, a method and a storage medium for vehicle inspection authorization information management.

BACKGROUND ART

It has been a common practice for people who wish to purchase a vehicle to visit a dealership and inspect the actual vehicle model before deciding to purchase the vehicle. In regard to such a purchasing process, JP2003-108821A discloses a system for searching a dealership where the user can actually inspect the particular vehicle model the user desires.

In recent years, it has become possible to purchase vehicles online. Even in such a case, the potential purchasers typically desire to inspect the actual vehicle model before purchasing. However, the potential purchaser may find it inconvenient to visit the dealership due to the time and effort required for such a visit. The inventors of this application have recognized that such a need of potential purchasers of vehicles can be satisfied by creating opportunities to inspect the vehicles of the desired model which are already owned and being used, instead of the vehicles being exhibited in the dealerships. Thereby, the number of vehicles available for inspection can be increased, and the potential purchasers are able to inspect the vehicles of a large variety. However, the owner of the vehicle offered for inspection may be located in or near the vehicle so that the inspecting user and the owner of the vehicle may run into each other, and this may create stress to both parties.

BRIEF SUMMARY OF THE INVENTION

In view of such a problem of the prior art and the recognition of the inventors, a primary object of the present invention is to provide a system and a method for vehicle inspection authorization information management that offer comfortable vehicle inspecting experience. Another object of the present invention is to provide a program that allows a computer to execute this method for vehicle inspection authorization information management.

To achieve such an object, the present invention provides a vehicle inspection authorization information management system (1), comprising an authorized vehicle information creation unit (22) and an inspecting user detection unit (23) which are formed by an information processing device including a processor and a nonvolatile memory, wherein the authorized vehicle information creation unit is configured to communicate with an inspecting user terminal (6) possessed by an inspecting user who wishes to inspect an authorized vehicle (7) to transmit vehicle information, a parking position, and a parking start time and end time of the authorized vehicle to the inspecting user terminal, the inspecting user detection unit is configured to communicate with the inspecting user terminal to acquire a location of the inspecting user terminal from the inspecting user terminal and notify that the inspecting user is located near the authorized vehicle by transmitting a signal to an authorizing user terminal possessed by an authorized user who owns the authorized vehicle when a distance between the location of the inspecting user terminal and the parking position is equal to or less than a determination value.

According to this aspect, the authorizing user can recognize through the authorizing user terminal that an inspecting user is located near the authorized vehicle. Thereby, the authorizing user is able to choose an action to avoid meeting the inspecting user. Thus, the vehicle inspection authorization information management system can provide a comfortable vehicle inspection experience.

In this system, preferably, the vehicle inspection authorization information management system further comprises an authorizing user detection unit (24) formed by an information processing device including a processor and a nonvolatile memory, and the authorizing user detection unit is configured to communicate with the authorizing user terminal to acquire a position of the authorizing user terminal from the authorizing user terminal and when a distance between a position of the authorizing user terminal and the parking position is equal to or less than a determination value, transmit a signal to the inspecting user terminal or the authorized vehicle to notify the inspecting user terminal or the authorized vehicle that the authorizing user is positioned near the authorized vehicle.

According to this aspect, the inspecting user can recognize from the inspecting user terminal or the authorized vehicle that the authorizing user is positioned near the authorized vehicle. Thereby, the inspecting user can choose an action to avoid meeting the authorizing user. Thus, the vehicle inspection authorization information management system can provide a comfortable vehicle inspection experience.

In this system, preferably, the vehicle inspection authorization information management system further comprises a meeting setting unit (26) formed by an information processing device including a processor and a nonvolatile memory, and the meeting setting unit is configured to receive meeting permission information corresponding to meeting permission or meeting refusal from the inspecting user terminal (6) and a portable authorizing user terminal (3), wherein a position of the inspecting user terminal is transmitted to the authorizing user terminal and a position of the authorizing user is transmitted to the inspecting user terminal when both parties are agreeable to a meeting.

According to this aspect, if both the authorizing user and the inspecting user wish to meet, the authorizing user and the inspecting user can obtain the locations of the other parties. Thereby, the authorizing user and the inspecting user can move toward each other to have a meeting.

In this system, preferably, the authorized vehicle information creation unit is configured to acquire a desired authorization period set by the authorizing user from the authorizing user terminal, create a revised authorization period by delaying the start time of the desired authorization period and advancing the end time of the desired authorization period and transmit the revised authorization period to the inspecting user terminal.

According to this aspect, it becomes easier to avoid an undesired meeting between the authorizing user and the inspecting user.

To achieve such an object, the present invention further provides a method for vehicle inspection authorization information management, comprising the steps of communicating with an inspecting user terminal (6) possessed by an inspecting user who desires to inspect an authorized vehicle (7) to transmit vehicle information of the authorized vehicle containing vehicle information, a parking position, a parking start time, and a parking end time of the authorized vehicle to the inspecting user terminal, and acquiring a position of the inspecting user terminal from the inspecting user terminal by communicating with the inspecting user terminal, a signal being transmitted to an authorizing user terminal possessed by an authorizing user who owns the authorized vehicle to notify a presence of the inspecting user near the authorized vehicle to the authorizing user when a distance between a position of the inspecting user terminal and the parking position is equal to or less than a determination value.

To achieve such an object, the present invention further provides a non-transitory computer-readable storage medium storing a program that causes a computer to execute a vehicle inspection authorization method including the steps of communicating with an inspecting user terminal (6) possessed by an inspecting user who desires to inspect an authorized vehicle (7) to transmit vehicle information of the authorized vehicle containing vehicle information, a parking position, a parking start time, and a parking end time of the authorized vehicle to the inspecting user terminal, and acquiring a position of the inspecting user terminal from the inspecting user terminal by communicating with the inspecting user terminal, a signal being transmitted to an authorizing user terminal possessed by an authorizing user who owns the authorized vehicle to notify a presence of the inspecting user near the authorized vehicle to the authorizing user when a distance between a position of the inspecting user terminal and the parking position is equal to or less than a determination value.

The present invention this provides a system and a method for vehicle inspection authorization information management that offer comfortable vehicle inspecting experience. The present invention further provides a program that allows a computer to execute this method for vehicle inspection authorization information management.

BRIEF DESCRIPTION OF THE DRAWINGS

FIG. 6 is an explanatory diagram showing the functional blocks of the vehicle inspection authorization information management system;

DETAILED DESCRIPTION OF THE PREFERRED EMBODIMENT(S)

A vehicle inspection authorization information management system according to an embodiment of the present invention will be described in the following with reference to the appended drawings. In the following description, an "authorized vehicle" means a vehicle that is offered to the public for inspection, and an "authorizing user" means a user who offers the authorized vehicle. An inspecting user means a user who wishes to inspect an authorized vehicle. There will be multiple authorized vehicles, multiple authorizing users, and multiple inspecting users. Typically but not exclusively, the inspecting users are those who are contemplating a purchase of a vehicle of a particular type or model, and the corresponding authorizing users are those who own the vehicles of this particular type or model.

Figure 1:
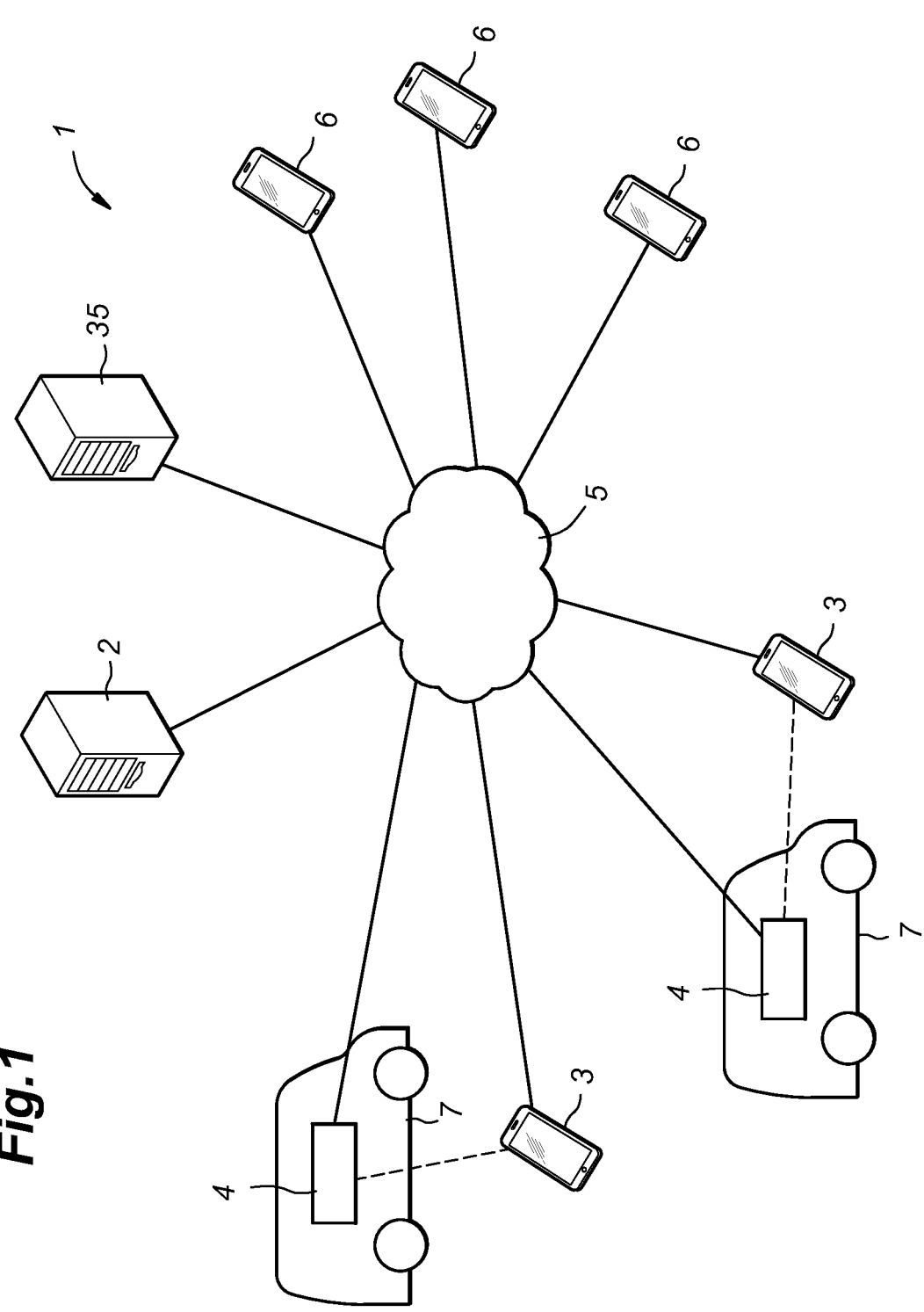
FIG. 1 is an explanatory diagram showing the hardware configuration of a vehicle inspection authorization information management system.

The vehicle inspection authorization information management system 1 consists of an information processing device including a processor and a nonvolatile memory. The vehicle inspection authorization information management system 1 may be configured by a single information processing device, or may be configured by a plurality of information processing devices that can communicate with each other. The information processing device is configured to execute various pieces of application software by having a processor for executing programs stored in a nonvolatile memory. FIG. 1 is an explanatory diagram showing the hardware configuration of the vehicle inspection authorization information management system 1. As shown in FIG. 1, the vehicle inspection authorization information management system 1 includes a management server 2 and a plurality of authorizing user terminals 3 and 4 that can communicate with the management server 2.

The management server 2 and the authorizing user terminals 3 and 4 are each configured by an information processing device. The management server 2 may also be configured by a plurality of information processing devices. The management server 2 and the authorizing user terminals 3 and 4 are preferably connected to a communication network 5 such as the Internet so as to be able to communicate in both directions. Further, a plurality of inspecting user terminals 6 are connected to the management server 2 via the communication network 5 so as to be able to communicate in both directions.

The authorizing user terminals 3 and 4 include portable authorizing user terminals 3 carried by authorizing users, and onboard authorizing user terminals 4 mounted on authorized vehicles 7.

Figure 2:
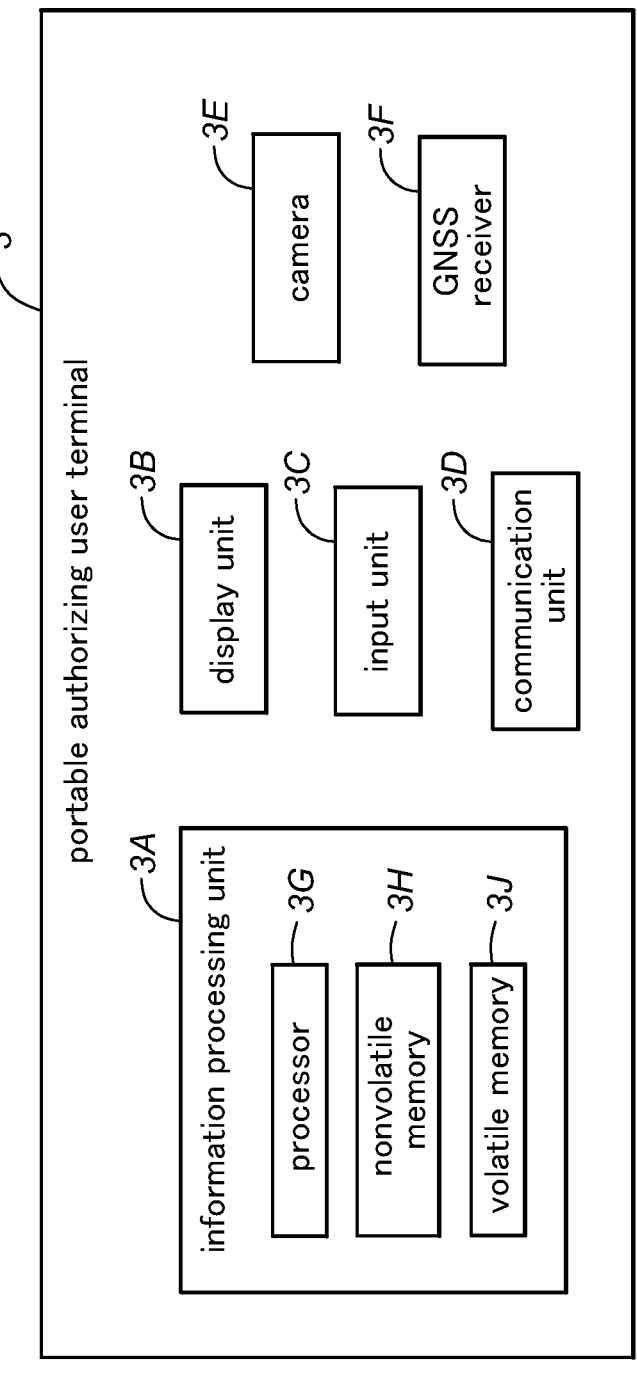
FIG. 2 is an explanatory diagram showing the hardware configuration of an authorizing user portable terminal.

FIG. 2 is an explanatory diagram showing the hardware configuration of the portable authorizing user terminal 3. As shown in FIG. 2, the portable authorizing user terminal 3 may each consist of a smartphone, a tablet PC, a notebook PC, a wearable computer, or the like. The portable authorizing user terminal 3 includes an information processing unit 3A, a display unit 3B, an input unit 3C, a communication unit 3D, a camera 3E, and a GNSS receiver 3F. The information processing unit 3A includes a processor 3G such as a CPU and an MPU, a nonvolatile memory 3H such as ROM and an SSD, and a volatile memory 3J such as a RAM. The display unit 3B and the input unit 3C may form an HMI (Human Machine Interface), and are preferably integrated as a touch panel display, for example. The communication unit 3D is connected to the communication network 5 by wireless communication. Furthermore, the communication unit 3D communicates with the onboard authorizing user terminal 4 provided in the authorized vehicle 7 by short-range wireless communication. The camera 3E is provided with, for example, a CCD (Charge Coupled Device) sensor or a CMOS (Complementary Metal Oxide Semiconductor) sensor and is configured to acquire image data. The GNSS receiver 3F receives a GNSS (Global Navigation Satellite System) signal. The information processing unit 3A speci-fies the geographical position of the portable authorizing user terminal 3 based on the GNSS signal.

Figure 3:
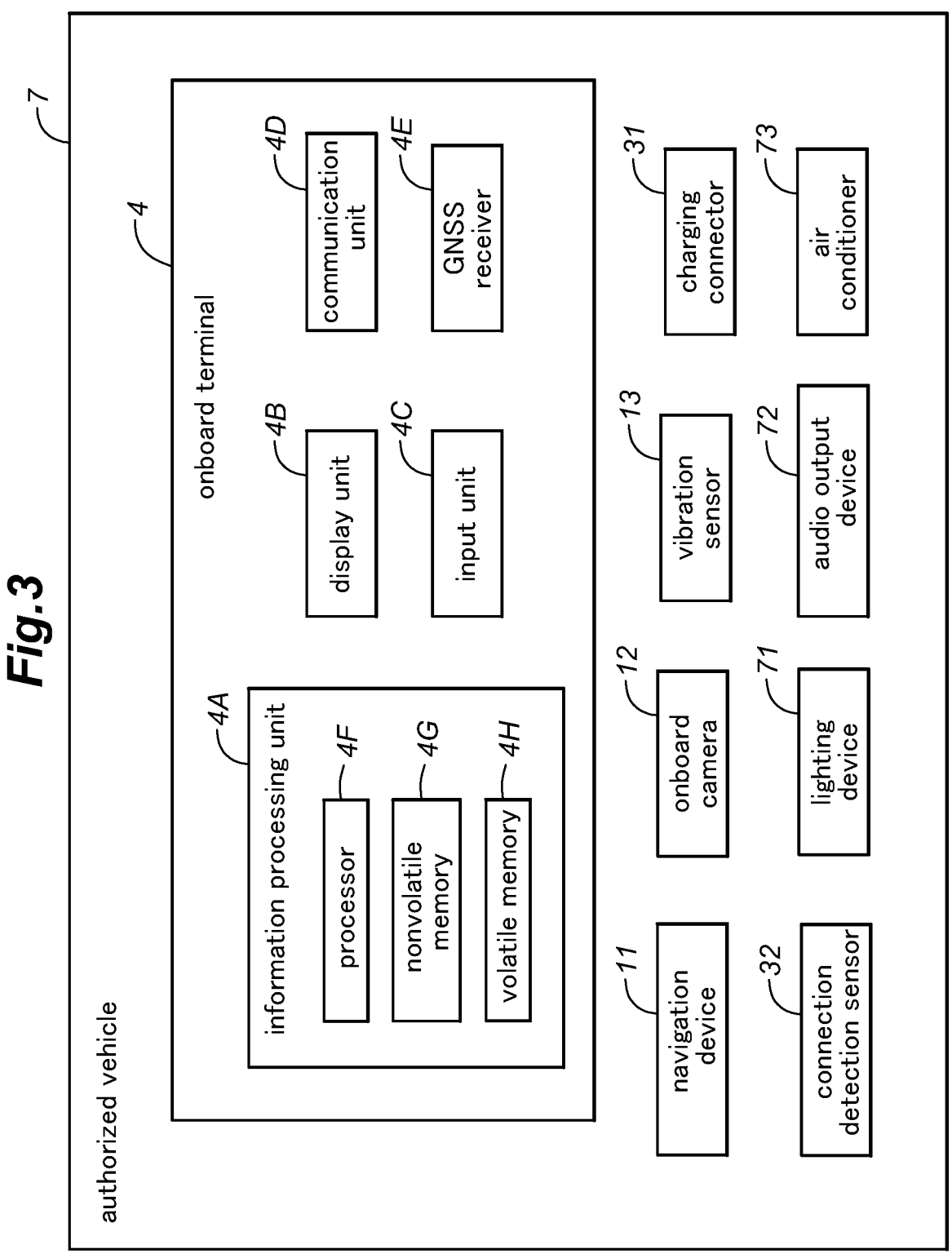
FIG. 3 is an explanatory diagram showing the hardware configuration of an authorized vehicle.

FIG. 3 is an explanatory diagram showing the hardware configuration of the authorized vehicle 7. As shown in FIG. 3, the onboard authorizing user terminal 4 includes an information processing unit 4A, a display unit 4B, an input unit 4C, a communication unit 4D, and a GNSS receiver 4E. The information processing unit 4A includes a processor 4F such as a CPU and an MPU, a nonvolatile memory 4G such as ROM and an SSD, and a volatile memory 4H such as RAM. The display unit 4B and the input unit 4C may be, for example, integrated as a touch panel display. The communication unit 4D is connected to the communication network 5 by wireless communication. Further, the communication unit 4D communicates with the portable authorizing user terminal 3 by short-range wireless communication. The information processing unit 4A of the onboard authorizing user terminal 4 specifies the geographical position of the authorized vehicle 7 based on the GNSS signal.

The authorized vehicle 7 is provided with a navigation device 11 that provides route guidance, an onboard camera 12, and a vibration sensor 13. The navigation device 11 may be formed integrally with the onboard authorizing user terminal 4. The onboard camera 12 may include a plurality of cameras that capture images of the environment surrounding the vehicle. The camera 3E may be provided inside the vehicle interior or may be provided on the exterior surface of the vehicle body. The vibration sensor 13 may be an acceleration sensor that detects acceleration applied to the authorized vehicle 7. The navigation device 11, the onboard camera 12, and the vibration sensor 13 are connected to the onboard authorizing user terminal 4.

Figure 4:
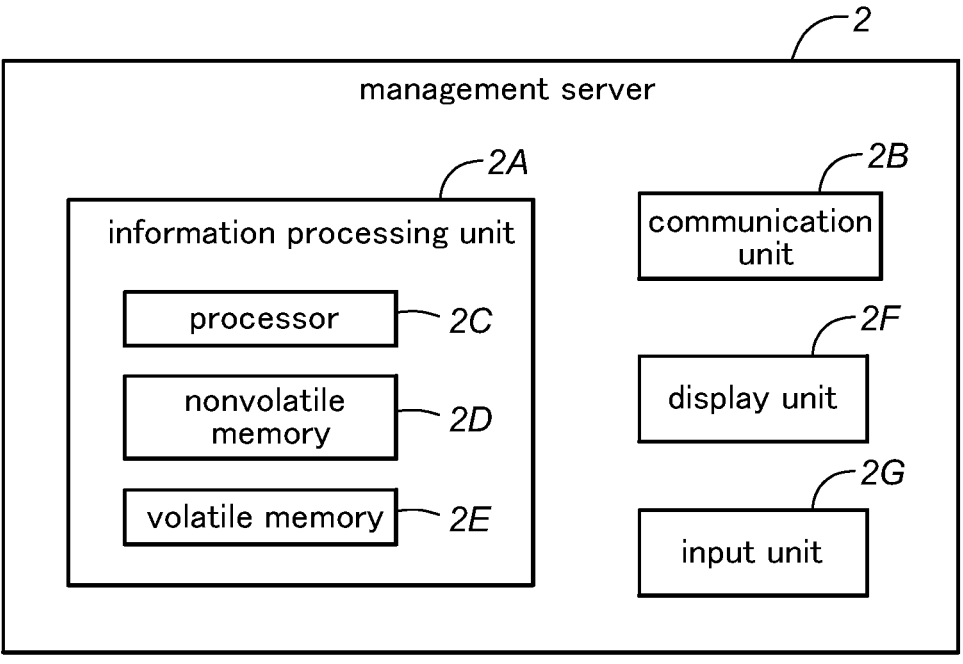
FIG. 4 is an explanatory diagram showing the hardware configuration of a management server.

FIG. 4 is an explanatory diagram showing the hardware structure of the management server 2. As shown in FIG. 4, the management server 2 includes an information processing unit 2A and a communication unit 2B. The information processing unit 2A includes a processor 2C such as a CPU and an MPU, a nonvolatile memory 2D such as ROM and an SSD, and a volatile memory 2E such as RAM. The communication unit 2B is connected to the communication network 5 by wireless communication. The management server 2 may further include a display unit 2F and an input unit 2G.

Figure 5:
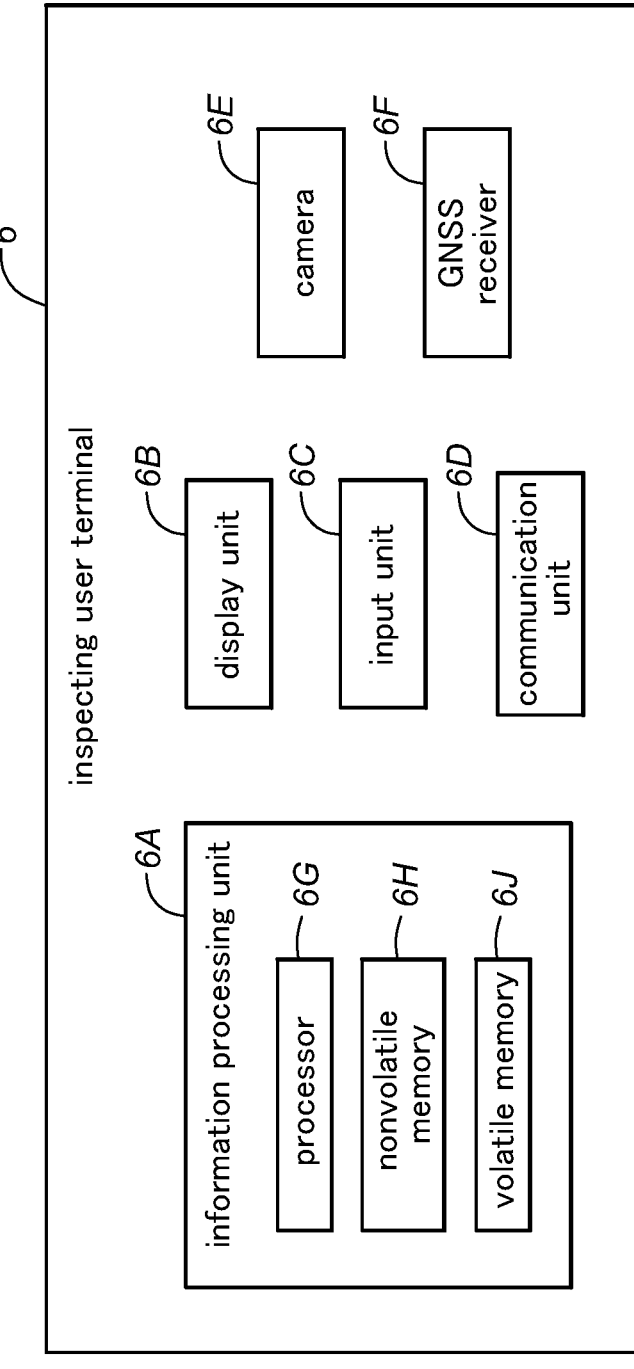
FIG. 5 is an explanatory diagram showing the hardware configuration of an inspecting user terminal.

FIG. 5 is an explanatory diagram showing the hardware structure of the inspecting user terminal 6. As shown in FIG. 5, the inspecting user terminal 6 preferably has the same configuration as the portable authorizing user terminal 3. The inspecting user terminal 6 includes an information processing unit 6A, a display unit 6B, an input unit 6C, a communication unit 6D, a camera 6E, and a GNSS receiver 6F. The information processing unit 6A includes a processor 6G such as a CPU and an MPU, a nonvolatile memory 6H such as ROM and an SSD, and a volatile memory 6J such as RAM. The information processing unit 6A identifies the geographical position of the inspecting user terminal 6 based on the GNSS signal.

The management server 2 includes an authorized vehicle information creation unit 22, an inspecting user detection unit 23, an authorizing user detection unit 24, an action management unit 25, a meeting setting unit 26, a vehicle information database 27 and a authorization information database 28.

Figure 6:
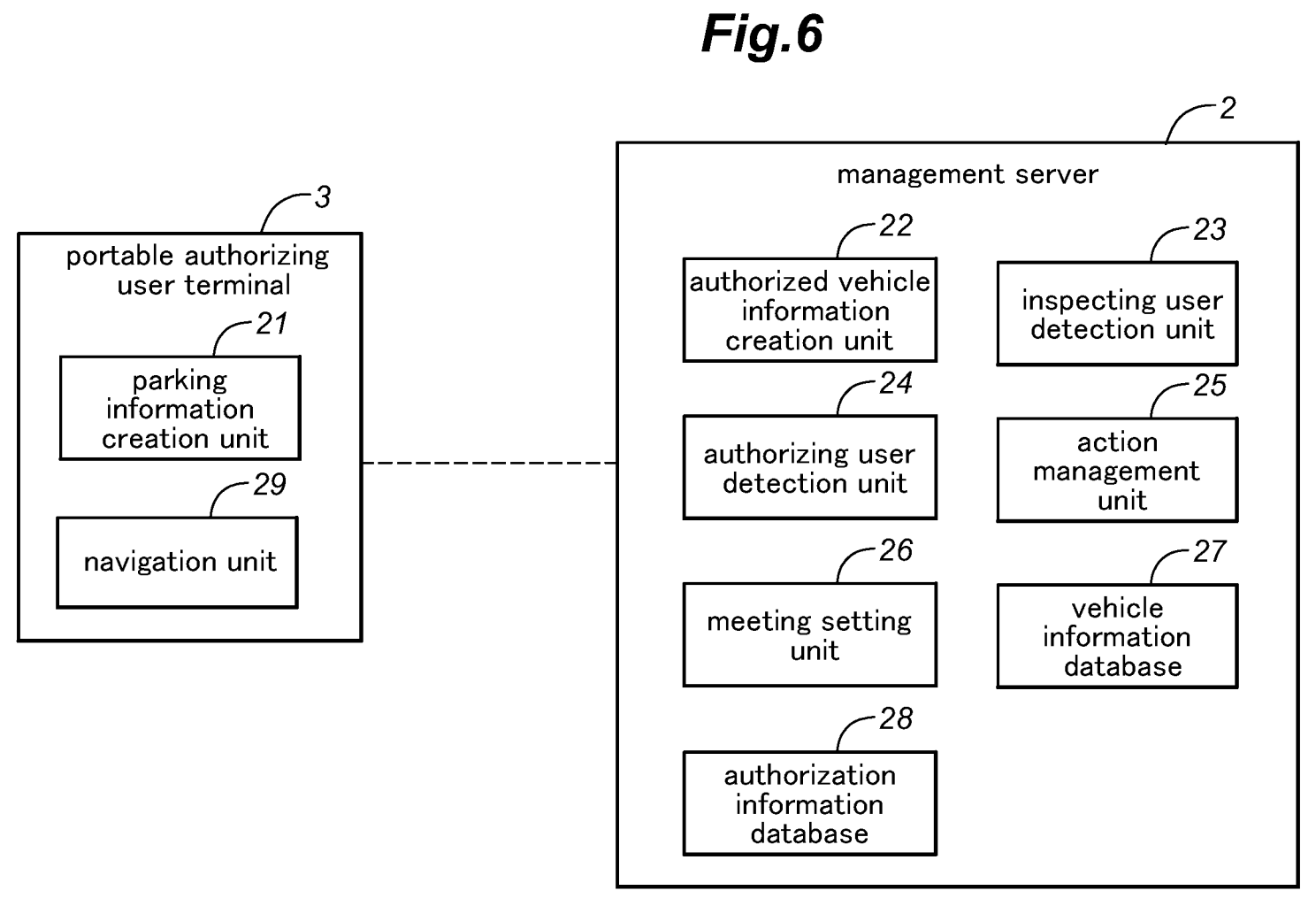

FIG. 6 is an explanatory diagram showing the functional blocks of the management server 2 along with a relevant part of the portable authorizing user terminal 3. In FIG. 6, the portable authorizing user terminal 3 includes a parking information creation unit 21. However, the parking information creation unit 21 may be realized by at least one of the management server 2, the portable authorizing user terminal 3 and the onboard authorizing user terminal 4.

The information processing unit 3A of the portable authorizing user terminal 3 may also include a navigation unit 29 that provides route guidance. The navigation unit 29 calculates a route from a departure point to a destination and an estimated time of arrival based on input including the departure point, destination and departure time, and outputs the calculated route to the display unit 3B. Further, the navigation unit 29 provides route guidance based on the location of the portable authorizing user terminal 3 and the route.

The parking information creation unit 21 is configured to create parking information including the current parking position of the authorized vehicle 7 or the future parking start time and parking position, and transmit this information to the authorized vehicle information creation unit 22. The parking information creation unit 21 is configured to create the parking information when predetermined creation conditions are met.

The parking information creation unit 21 may create parking information by detecting the position of the authorized vehicle 7, and if the position of the authorized vehicle 7 does not change for a predetermined period of time, determining that the authorized vehicle 7 is parked. Each portable authorizing user terminal 3 may communicate with the onboard authorizing user terminal 4 of the corresponding authorized vehicle 7 to obtain the position of the authorized vehicle 7. The parking information creation unit 21 may monitor the position of the authorized vehicle 7 and create parking information if the position of the authorized vehicle 7 remains unchanged for a prescribed determination period. The parking information may include an identification number that identifies the authorized vehicle 7 and the current position (parking position) of the authorized vehicle 7. The parking information creation unit 21 transmits the created parking information to the authorized vehicle information creation unit 22.

The parking information creation unit 21 may be configured to detect the position of the authorized vehicle 7 and the connection state between the authorized vehicle 7 and a charging outlet, so that parking information may be created by detecting that the authorized vehicle 7 is parked when the authorized vehicle 7 and the charging outlet are connected. As shown in FIG. 3, when the authorized vehicle 7 is an electric vehicle such as an electric car or an electric motorcycle, the authorized vehicle 7 may be provided with a charging connector 31 that can be connected to the charging outlet of the charging station and a connection detection sensor 32 that detects the connection state between the charging connector 31 and the charging outlet. The connection detection sensor 32 may be a switch that detects the connection state between the charging connector 31 and the charging outlet by coming into contact with the charging outlet, or a current sensor that detects the connection state between the charging connector 31 and the charging outlet by detecting the electric current flowing through the charging connector 31. The onboard authorizing user terminal 4 preferably detects the connection state between the authorized vehicle 7 and the charging outlet based on the signal from the connection detection sensor 32. Preferably, the portable authorizing user terminal 3 communicates with the corresponding onboard authorizing user terminal 4 to acquire the connection state between the authorized vehicle 7 and the charging outlet and the position of the authorized vehicle 7. The parking information creation unit 21 may be configured to create the parking information when the connection between the authorized vehicle 7 and the charging outlet is detected. The parking information may include an identification number that identifies the authorized vehicle 7 and the current position (parking position) of the authorized vehicle 7. The parking information creation unit 21 transmits the created parking information to the authorized vehicle information creation unit 22.

The parking information creation unit 21 may be configured to determine that the authorized vehicle 7 is parked and create the corresponding parking information by determining the position of the authorized vehicle 7 to be within a predetermined inspection area. Preferably, each portable authorizing user terminal 3 communicates with the onboard authorizing user terminal 4 of the corresponding authorized vehicle 7 to acquire the position of the authorized vehicle 7. The parking information creation unit 21 may determine if the position of the authorized vehicle 7 is in an inspection area, and create the parking information when the position of the authorized vehicle 7 is in the inspection area. The inspection area may be designated, for instance, in a parking lot of a commercial facility such as a supermarket or movie theater, a parking lot of an event venue such as a stadium or theme park, or an area designated in a paid parking lot. The position data of the inspection area is preferably stored in the portable authorizing user terminal 3 in advance. The parking information may include the identification number that identifies the authorized vehicle 7 and the current position (parking position) of the authorized vehicle 7. The parking information creation unit 21 transmits the created parking information to the authorized vehicle information creation unit 22.

The parking information creation unit 21 may also create parking information by acquiring the destination and target arrival time of the authorized vehicle 7 and setting the target arrival time as the parking start time and the destination as the parking position. Instead of relying on the navigation device 11 of the authorized vehicle 7, the parking information creation unit 21 may use the destination and target arrival time of the authorized vehicle 7 acquired by the navigation unit 29 of the portable authorizing user terminal 3. The parking information creation unit 21 may create the parking information when the navigation device 11 has calculated the target route and target arrival time. Furthermore, the parking information creation unit 21 may create the parking information when the navigation device 11 starts guidance based on a target route.

The parking information creation unit 21 may also create parking information by acquiring the charging reservation information of the authorized vehicle 7, and setting the charging start time included in the charging reservation information as a future parking start time and the charging point as the parking position, and transmit the parking information to the authorized vehicle information creation unit 22. As shown in FIG. 1, the parking information creation unit 21 preferably communicates with a charging reservation server 35 that manages reservations for charging stations for charging the authorized vehicles 7 to obtain the charging reservation information. The charging point is a location where the authorized vehicle 7 will be parked for charging. The charging start time is the time when it becomes possible for the authorizing user to use the charging station to charge the authorized vehicle 7.

The charging reservation server 35 is an information processing device including a processor and a nonvolatile memory, and realizes various applications by having the processor execute programs stored in the nonvolatile memory. The charging reservation server 35 is connected to the communication network 5. The authorizing user transmits charging reservation application information to the charging reservation server 35 by using the portable authorizing user terminal 3. The charging reservation application information may include a user identification number, a desired charging location (charging site), a usage start time, and a usage end time. The charging reservation server 35 has a reservation management database which includes a plurality of reservation information records each containing the name of the user making the reservation, the charging location, the usage start time and the usage end time. The charging reservation server 35 refers to the reservation management database, and if there is no existing reservation information record that overlaps with the charging position and usage time specified by the received charging reservation application information, the charging reservation server 35 finalizes the reservation based on the charging reservation application information, and writes the reservation information record into the reservation management database. When the charging reservation server 35 confirms the reservation based on the charging reservation application information, the charging reservation server 35 preferably transmits the charging reservation information to the portable authorizing user terminal 3 that has transmitted charging reservation application information. The parking information creation unit 21 may create the parking information upon receiving the charging reservation information from the charging reservation server 35.

The parking information creation unit 21 may create parking information based on the authorizing user's input operation to the portable authorizing user terminal 3. The parking information creation unit 21 preferably causes the display unit 3B to display an input screen that accepts inputs of the parking position, parking start time, and parking end time of the authorized vehicle 7. The parking information creation unit 21 may accept the parking start time as the authorization start time and the parking end time as the authorization end time. The parking information creation unit 21 may accept the parking start time and the parking end time as the desired authorization period. The start time and end time of the desired authorization period correspond to the parking start time and parking end time. The parking information creation unit 21 preferably creates the parking information when the authorizing user completes the input of the parking position, parking start time, and parking end time.

The parking information creation unit 21 may display a selection button for permitting or prohibiting creation of parking information on the display unit 3B, and may prohibit creation of parking information when prohibition is selected by operating the selection button. According to this aspect of the present invention, it is possible to prohibit the parking information creation unit 21 from automatically creating parking information. Thereby, the authorizing user who is the owner of the authorized vehicle 7 can stop offering the authorized vehicle 7 for inspection. Immediately before creating the parking information, the parking information creation unit 21 may display a selection button for permitting or prohibiting the creation of the parking information on the display unit 3B.

The parking information creation unit 21 may display a selection button on the display unit 3B for permitting or prohibiting transmission of the parking information to the authorized vehicle information creation unit 22 of the parking information management server 2, and prohibit the transmission of the parking information to the authorized vehicle information creation unit 22 when prohibition is selected by operating the selection button. The parking information creation unit 21 may display a selection button on the display unit 3B when the parking information is created. As a result, the authorizing user who is the owner of the authorized vehicle 7 can select if the parking information creation unit 21 may transmit the parking information to the authorized vehicle information creation unit 22 or not, and if the authorization of the inspection of the authorized vehicle 7 is to be canceled or not.

The authorized vehicle information creation unit 22 of the management server 2 receives the parking information from the parking information creation unit 21, and based on the parking information, creates the authorized vehicle information that includes the vehicle information of the authorized vehicle 7, the parking position, the authorization start time, and the authorization end time. The authorized vehicle information creation unit 22 identifies the authorizing user and the authorized vehicle 7 based on the identification number included in the parking information. The management server 2 is provided with a vehicle information database 27 in which the vehicle information of the authorized vehicles 7 is recorded in advance. The authorized vehicle information creation unit 22 searches the vehicle information database 27 based on the identification number, and retrieves the vehicle information of the authorized vehicle 7. The vehicle information includes at least the vehicle type (vehicle model) of the authorized vehicle 7. Further, the vehicle information may include the color, grade, installed options, date of manufacture, etc. of the authorized vehicle 7. The vehicle information may also include information regarding any damage on the authorized vehicle 7, such as the locations of scratches and dents.

When the parking information includes the current parking position, the authorized vehicle information creation unit 22 sets the current parking position as the current parking position, and sets the current time as the authorization start time and the time point given by adding the expected parking period to the current time as the authorization end time. The authorized vehicle information creation unit 22 may acquire the expected parking period based on the parking position with reference to a map that defines the relationship between the parking position and the expected parking period. Further, the authorized vehicle information creation unit 22 may set a preset constant for the expected parking period.

When the parking information includes a future parking position, the authorized vehicle information creation unit 22 sets the future parking position as the parking position, and sets the future parking start time as the authorization start time and the time point given by adding the expected parking period to the future parking start time as the authorization end time.

When the authorized vehicle information creation unit 22 has acquired the desired authorization period set by the authorizing user from the portable authorizing user terminal 3, the authorized vehicle information creation unit 22 may delay the start time of the desired authorization period and advance the end time of the desired authorization period, for instance by 15 minutes or the like in either case, and transmit the revised authorization period to the inspecting user terminal 6.

The authorized vehicle information creation unit 22 stores the created authorized vehicle information in the authorization information database 28. The authorization information database 28 is stored in the memory of the management server 2. The authorization information database 28 includes a plurality of authorized vehicle information records.

The authorized vehicle information creation unit 22 transmits the authorized vehicle information of the authorized vehicle 7 to a plurality of inspecting user terminals 6. For example, the authorized vehicle information creation unit 22 may extract from the authorization information database 28 the authorized vehicle information whose parking start time is before the current time and whose parking end time is after the current time, and transmit the extracted authorized vehicle information to the inspecting user terminals 6. Each inspecting user terminal 6 may also create a query for extracting authorized vehicle information in response to the inspecting user's operation and transmit the query to the authorized vehicle information creation unit 22. The authorized vehicle information creation unit 22 may search the authorization information database 28 based on the query received from the inspecting user terminal 6, extract authorized vehicle information that matches the query, and send the extracted authorized vehicle information to the inspecting user terminal 6. The query may include vehicle information, parking position, authorization start time, authorization end time, and the like. The query may be registered in advance.

Preferably, the authorized vehicle information creation unit 22 is configured to transmit the authorized vehicle information to the inspecting user terminal 6 at any timing. The authorized vehicle information creation unit 22 may transmit the authorized vehicle information to the inspecting user terminal 6 at predetermined intervals. Further, the authorized vehicle information creation unit 22 may transmit the authorized vehicle information to the inspecting user terminal 6 upon receiving a request from the inspecting user terminal 6. Further, the authorized vehicle information creation unit 22 may transmit the authorized vehicle information to the inspecting user terminal 6 when authorized vehicle information that matches the query is generated.

Figure 7:
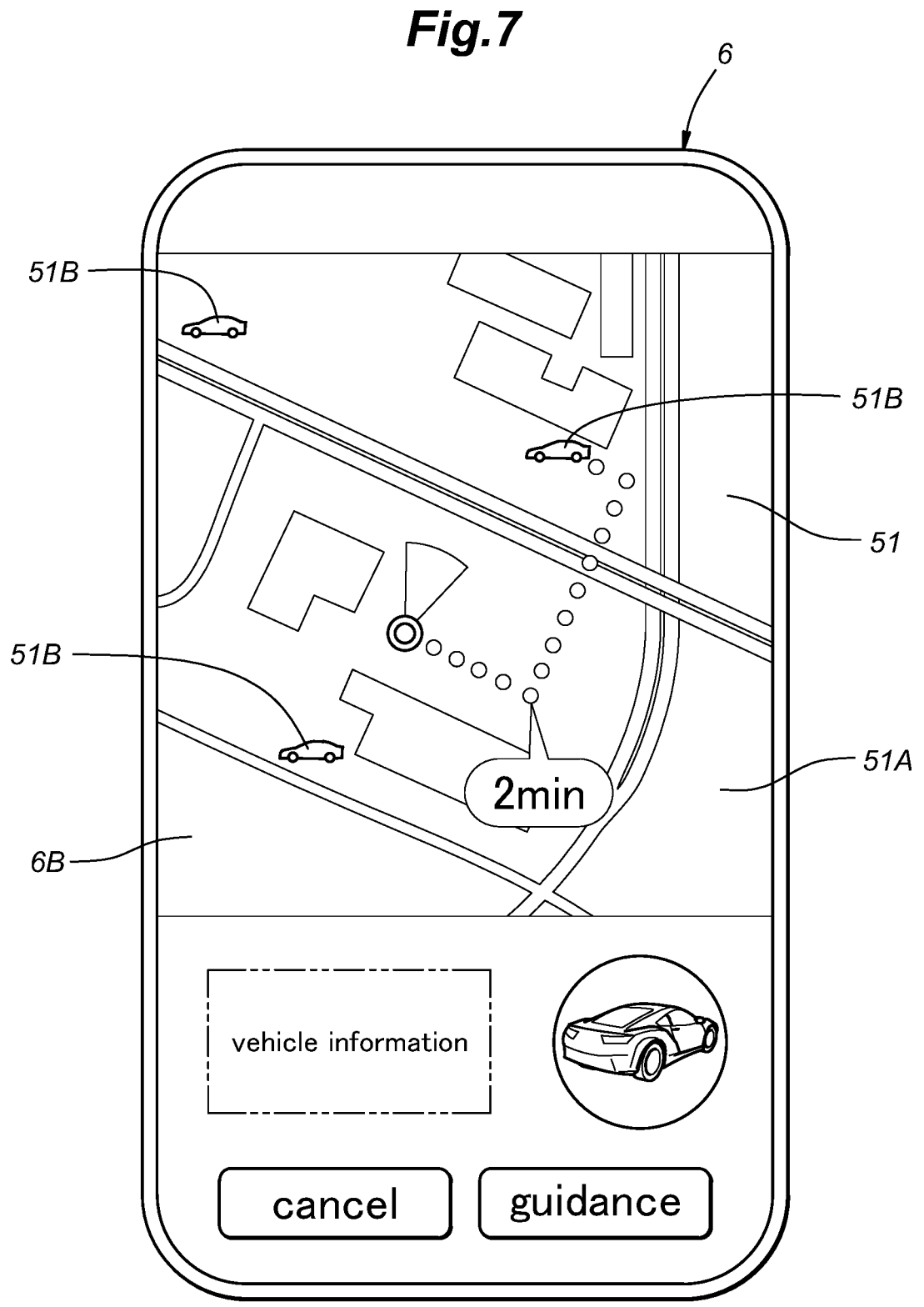
FIG. 7 is a diagram showing an example of an authorized vehicle map displayed on the display unit of the inspecting user terminal.
Figure 8:
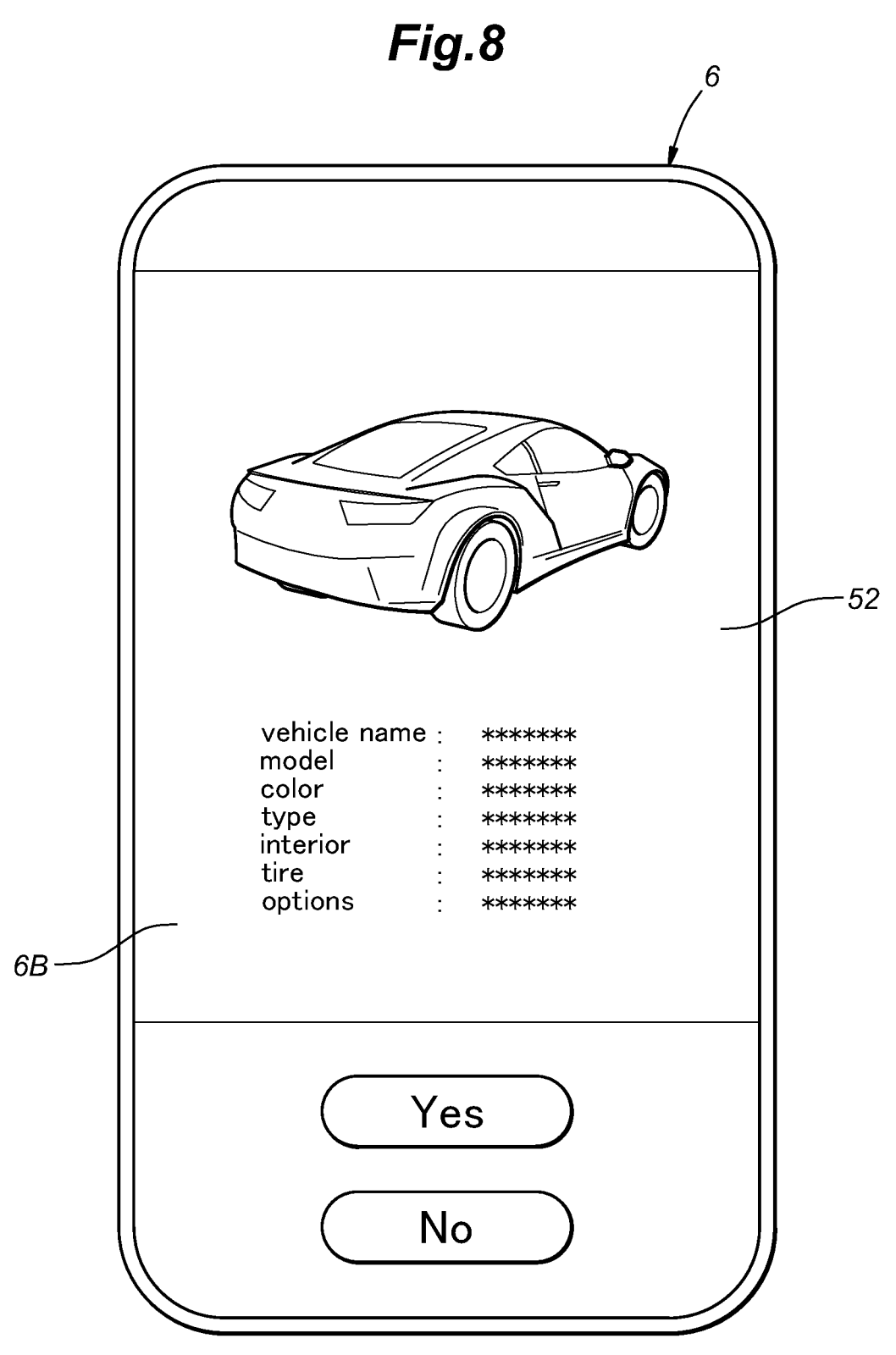
FIG. 8 is a diagram showing an example of a vehicle information screen displayed on the display unit of the inspecting user terminal.

The authorized vehicle information creation unit 22 may create an authorized vehicle map based on the authorized vehicle information, transmit the created authorized vehicle map to the inspecting user terminal 6 and display it on the display unit 6B of the inspecting user terminal 6. FIG. 7 is a diagram showing an example of the authorized vehicle map 51 displayed on the inspecting user terminal 6. As shown in FIG. 7, the authorized vehicle map 51 includes a geographical map 51A and a plurality of icons 51B each indicating the position of the corresponding authorized vehicle 7 overlapped on the map 51A. When one of the icons 51B is selected, the inspecting user terminal 6 may cause the display unit 6B to display a vehicle information screen 52 that displays information about the authorized vehicle 7 corresponding to the particular icon 51B. FIG. 8 is a diagram showing an example of the vehicle information screen 52 displayed on the inspecting user terminal 6. As shown in FIG. 8, the vehicle information screen 52 preferably includes the vehicle information of the authorized vehicle 7, the parking position, the authorization start time, and the authorization end time.

The inspecting user can travel to the desired authorized vehicle 7 by viewing the authorized vehicle map 51 displayed on the display unit 6B of the inspecting user terminal 6. The inspecting user terminal 6 may have a function to provide route guidance to the parking position of the authorized vehicle 7 selected on the authorized vehicle map 51. In another embodiment, the authorized vehicle information creation unit 22 transmits the authorized vehicle information to the inspecting user terminal 6, and the inspecting user terminal 6 creates the authorized vehicle map 51 based on the authorized vehicle information.

The inspecting user detection unit 23 communicates with the inspecting user terminal 6 to acquire the position of the inspecting user terminal 6, and determines if the distance between the position of the inspecting user terminal 6 and the parking position of any one of the authorized vehicles 7 is equal to or less than a first determination value. The inspecting user terminal 6 acquires the position of the inspecting user terminal 6 based on the GNSS signal. The inspecting user detection unit 23 acquires the position information of the inspecting user terminal 6 from the inspecting user terminal 6. The inspecting user detection unit 23 may refer to the authorization information database 28 to search if there is any authorized vehicle 7 whose parking position is within a first determination value from the position of the inspecting user terminal 6. Thus, when there is an authorized vehicle 7 whose parking position is within the first determination value from the position of the inspecting user terminal 6, the inspecting user can determine that the distance between the position of the inspecting user terminal 6 and parking position of one of the authorized vehicles 7 is equal to or less than the first determination value.

When the distance between the location of the inspecting user terminal 6 and the parking position of the authorized vehicle 7 is equal to or less than the first determination value, it can be estimated that the inspecting user is present around the authorized vehicle 7, or is actually inspecting the authorized vehicle 7. The first determination value may be set to, for example, 1 to 10 m.

The action management unit 25 issues photographing recommend information to the inspecting user terminal 6 to prompt the inspecting user to take a photographic picture of the authorized vehicle 7 when the distance between the position of the inspecting user terminal 6 and the parking position of the authorized vehicle 7 is equal to or less than a first determination value. The photographing recommendation information may be a message or an image displayed on the display unit 6B of the inspecting user terminal 6. Further, the photographing recommendation information may be an audio message outputted from the inspecting user terminal 6. The photographing recommendation information is outputted for the purpose of prompting the inspecting user to photograph the authorized vehicle 7. By the photographing of the authorized vehicle 7 by the inspecting user, the state of the authorized vehicle 7 at that time can be recorded. As a result, when damage such as a scratch or a dent is subsequently discovered on the authorized vehicle 7, it becomes easier to identify when the damage was made. Preferably, the action management unit 25 transmits the photographing recommendation information to the inspecting user terminal 6, and the inspecting user terminal 6 makes a corresponding notification based on the photographing recommendation information.

Figure 9:
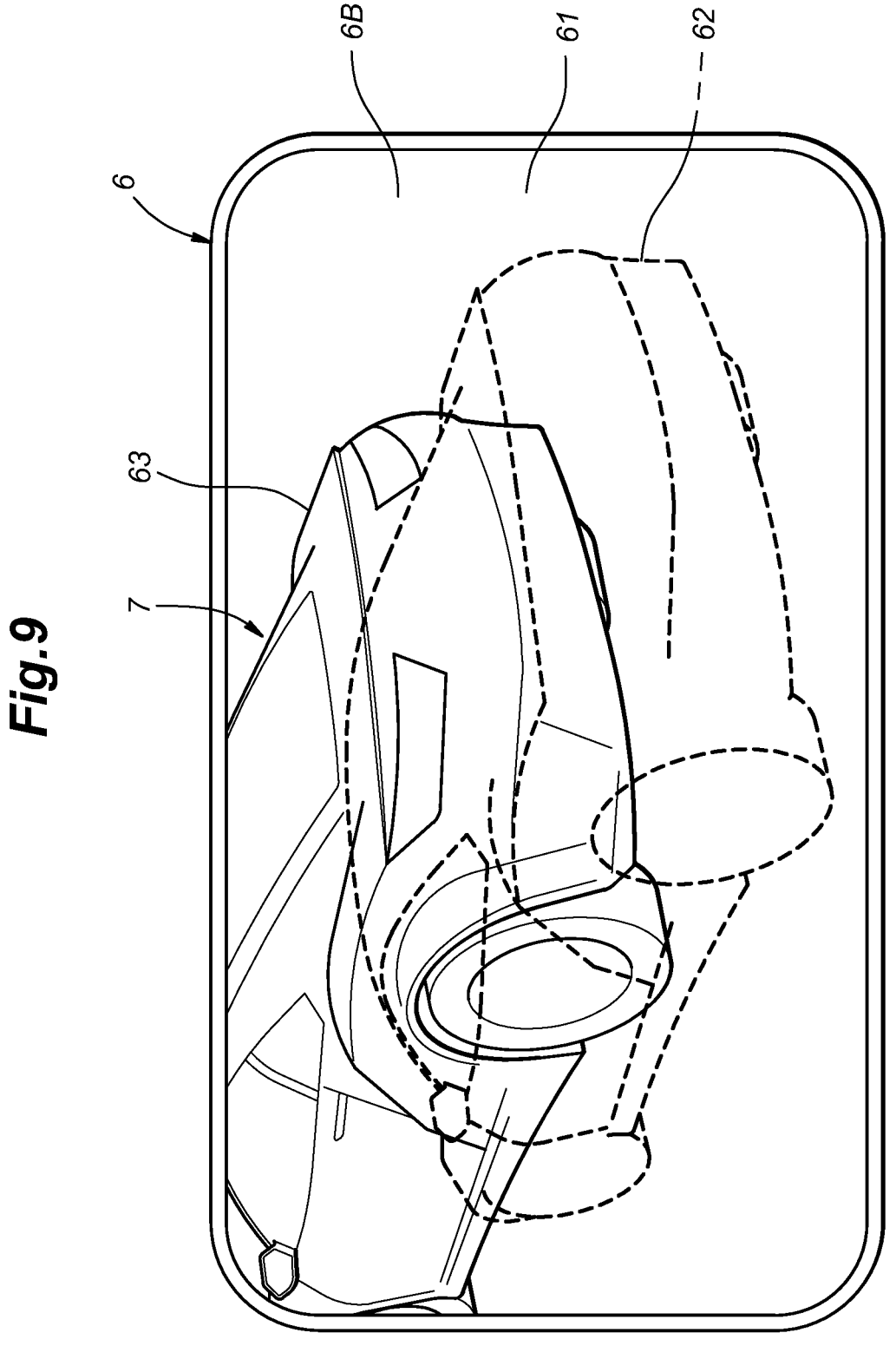
FIG. 9 is a diagram showing an example of a photographing screen displayed on the display unit of the inspecting user terminal.

The photographing recommendation information preferably includes a guideline 62 indicating the photographing position and direction which is superimposed on a photographing screen 61 displayed on the inspecting user terminal 6. The inspecting user terminal 6 is equipped with a camera application for using the camera 6E. The camera application displays a photographing screen 61 on the display unit 6B of the inspecting user terminal 6. FIG. 9 is a diagram showing an example of the photographing screen 61 displayed on the display unit 6B of the inspecting user terminal 6. As shown in FIG. 9, the image captured by the camera 6E is displayed on the photographing screen 61. The guideline 62 may be a figure imitating the outer shape of the vehicle, and is displayed superimposed on the photographing screen 61. The user adjusts the direction of the camera 6E and the distance between the authorized vehicle 7 and the camera 6E so that the external shape 63 of the authorized vehicle 7 matches the guideline 62, thereby allowing an image suitable for recording the state of the authorized vehicle 7 to be captured. Preferably, a plurality of guidelines 62 are prepared so as to be displayed in a prescribed order on the display unit 6B each time a photographic image is captured.

The action management unit 25 preferably causes the image captured by the inspecting user terminal to be transmitted to the action management unit 25 after the inspecting user terminal 6 is notified of the photographing recommendation information. Preferably, the action management unit 25 transmits an image transmission request to the inspecting user terminal 6, and the inspecting user terminal 6 transmits the captured image to the action management unit 25 in response to the image transmission request. Thereby, the action management unit 25 can acquire the image captured by the inspecting user terminal 6. The action management unit 25 may identify the authorized vehicle 7 based on the location of the inspecting user, associate the image taken by the inspecting user terminal 6 with the target authorized vehicle 7, and store the image in the vehicle information database 27. The images stored in the vehicle information database 27 are preferably maintained for a predetermined period of time. For example, when there is a discrepancy in the recognition of the state of the authorized vehicle 7 between the authorizing user and the inspecting user, the images stored in the vehicle information database 27 may be used. Furthermore, the images stored in the vehicle information database 27 may be transmitted to a terminal or database of a specific third party organization.

The action management unit 25 may transmit the image acquired from the inspecting user terminal 6 to the authorizing user terminals 3 and 4 of the authorizing user who is the owner of the authorized vehicle 7. The action management unit 25 preferably refers to the vehicle information database 27 and identifies the authorizing user and the authorizing user terminals 3 and 4 corresponding to the authorized vehicle 7. Thereby, the authorizing user terminals 3 and 4 can acquire the image captured by the inspecting user terminal 6. This allows the authorizing user to use the authorizing user terminals 3 and 4 to check the image taken by the inspecting user terminal 6.

The action management unit 25 may cause the inspecting user terminal 6 to notify the photographing recommendation information again after a predetermined period has elapsed since the inspecting user terminal 6 notified the photographing recommendation information. This allows the state of the vehicle to be recorded multiple times during the inspection. Additionally, the state of the vehicle at a time point close to the end of the inspection can also be stored.

The action management unit 25 communicates with the authorized vehicle 7, and when the distance between the location of the inspecting user terminal 6 and the parking position is equal to or less than a first determination value, may cause a photographic image of the surrounding area to be captured by using the onboard camera 12 provided on the authorized vehicle 7. The action management unit 25 preferably communicates with the onboard authorizing user terminal 4 and causes the onboard authorizing user terminal 4 to control the onboard camera 12. Thereby, the onboard camera 12 provided on the authorized vehicle 7 can photograph the surrounding state of the vehicle that is being inspected and the inspecting user. The images captured by the onboard camera 12 are preferably stored in the onboard authorizing user terminal 4.

The action management unit 25 communicates with the authorized vehicle 7 and when the vibration sensor 13 provided on the authorized vehicle 7 has detected a vibration whose magnitude is equal to or higher than a predetermined threshold value, may cause the onboard camera 12 to photograph the surrounding area of the authorized vehicle 7. The onboard authorizing user terminal 4 preferably monitors vibrations whose magnitudes exceed a threshold value based on the signal from the vibration sensor 13, and when the magnitudes of the vibrations exceed the threshold value, causes the onboard camera 12 to continue the capturing of images for a predetermined period of time from then on. As a result, the onboard camera 12 provided on the authorized vehicle 7 can photograph the surrounding state of the vehicle and the inspecting user when vibrations whose magnitudes exceed a threshold value occur in the authorized vehicle 7.

The threshold value is lower when the distance between the position of the inspecting user terminal 6 and the parking position is equal to or less than the first determination value than when the distance between the position of the inspecting user terminal 6 and the parking position is greater than the first determination value. As a result, when there is an inspecting user around the authorized vehicle 7, or the inspecting user is inspecting the authorized vehicle, the onboard camera 12 can start taking pictures upon detecting a comparatively smaller vibration than in normal times.

Figure 10:
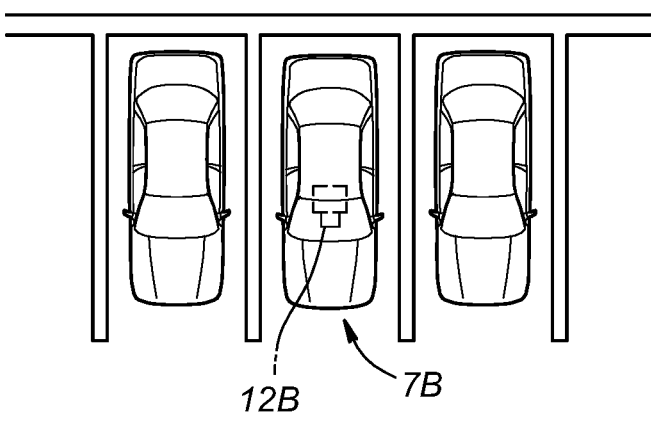
FIG. 10 is an explanatory diagram showing two authorized vehicles parked in a parking lot.
Figure 10:
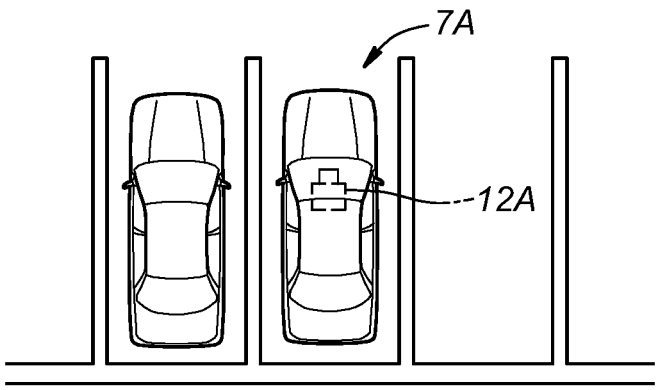

FIG. 10 is an explanatory diagram showing two authorized vehicles 7A and 7B parked in a parking lot. The action management unit 25 communicates with the authorized vehicles 7 including the first authorized vehicle 7A and the second authorized vehicle 7B, and acquires the positions of the first authorized vehicle 7A and the second authorized vehicle 7B. When the distance between the first authorized vehicle 7A and the second authorized vehicle 7B is equal to or less than a predetermined second determination value, the action management unit 25 causes the first onboard camera 12A mounted on the first authorized vehicle 7A to photograph the second authorized vehicle 7B, and the second onboard camera 12B mounted on the second authorized vehicle 7B to photograph the first authorized vehicle 7A. Thus, when there is a second authorized vehicle 7B near the first authorized vehicle 7A, the first authorized vehicle 7A is photographed by the onboard camera 12 of the second authorized vehicle 7B, and the first authorized vehicle 7A is photographed by the onboard camera 12 of the first authorized vehicle 7A.

In another embodiment, when the distance between the position of the first authorized vehicle 7A and the position of the inspecting user terminal 6 is equal to or less than the first determination value, the action management unit 25 causes the second authorized vehicle 7B located within the second predetermined distance from the first authorized vehicle 7A to photograph the first authorized vehicle 7A. Thus, when there is a second authorized vehicle 7B near the first authorized vehicle 7A, the first authorized vehicle 7A is photographed by the onboard camera 12 of the second authorized vehicle 7B.

The action management unit 25 may cause the inspecting user terminal 6 to display a homepage that advertises auto insurance policies when the distance between the location of the inspecting user terminal 6 and the parking position of the authorized vehicle 7 is equal to or less than the first determination value. Preferably, the action management unit 25 sends a message including the Internet address of a homepage that advertises auto insurance policies to the inspecting user terminal 6. The inspecting user terminal 6 may display the received message on the display unit 6B. Thereby, the action management unit 25 can recommend the auto insurance policies to the inspecting user.

When the distance between the position of the inspecting user terminal 6 and the parking position of the authorized vehicle 7 is equal to or less than the first determination value, the inspecting user detection unit 23 transmits a signal to the portable authorizing user terminal 3 to notify the portable authorizing user terminal 3 that an inspecting user is present near the authorized vehicle 7. The portable authorizing user terminal 3 may notify the authorizing user by displaying a message on the display unit 3B indicating that an inspecting user is present in the vicinity of the authorized vehicle 7 based on the signal received from the inspecting user detection unit 23. Thereby, the authorizing user can recognize via the portable authorizing user terminal 3 that the inspecting user is present around the authorized vehicle 7. Thereby, the authorizing user can recognize that the authorized vehicle 7 is being inspected, and the authorizing user can choose an action to avoid facing the inspecting user. In this way, the vehicle inspection authorization information management system 1 can provide a comfortable vehicle inspection experience.

The authorizing user detection unit 24 communicates with the portable authorizing user terminal 3 to acquire the position of the portable authorizing user terminal 3 from the portable authorizing user terminal 3, and if the distance between the position of the portable authorizing user terminal 3 and the parking position of the authorized vehicle 7 is equal to or less than a third determination value, transmits a signal to the inspecting user terminal 6 or the authorized vehicle 7 to notify the inspecting user terminal 6 or the authorized vehicle 7 that the authorizing user is present around the authorized vehicle 7. The third determination value may be set to a value larger than the first determination value. When the distance between the position of the portable authorizing user terminal 3 and the parking position of the authorized vehicle 7 is equal to or less than the third determination value, the authorizing user detection unit 24 transmits a signal to the inspecting user terminal 6 to cause the inspecting user terminal 6 to display a screen on the display unit 6B to indicate that the authorizing user is approaching the authorized vehicle 7.

Further, when the distance between the position of the portable authorizing user terminal 3 and the parking position of the authorized vehicle 7 is equal to or less than a third determination value, the authorizing user detection unit 24 transmits a signal to the onboard authorizing user terminal 4 of the authorized vehicle 7 so as to cause the onboard authorizing user terminal 4 to notify this by controlling at least one of a lighting device 71, an audio output device 72 and an air conditioner 73 provided in the authorized vehicle 7 based on this signal. The lighting device 71 may be a headlight, a tail lamp, a turn signal or a room lamp. The audio output device 72 is preferably a speaker. For instance, the onboard authorizing user terminal 4 may turn on the lighting device 71. The air conditioner 73 is a device that supplies temperature-controlled air to the cabin of the authorized vehicle 7, and includes a blower. When the blower of the air conditioner 73 is driven, operation noise is generated. The operation noise of the air conditioner 73 allows the inspecting user positioned around the authorized vehicle 7 to recognize that the system of the authorized vehicle 7 is operating. The onboard authorizing user terminal 4 may control the air conditioner 73 based on the signal received from the portable authorizing user terminal 3. In other words, the authorizing user can operate the portable authorizing user terminal 3 to remotely control the air conditioner 73.

Thereby, the inspecting user can recognize through the inspecting user terminal 6 or the authorized vehicle 7 that an authorizing user is present around the authorized vehicle 7. Thereby, the inspecting user can choose an action to avoid facing the authorizing user. In this way, the vehicle inspection authorization information management system 1 can provide a comfortable vehicle inspection experience.

The meeting setting unit 26 receives meeting permission information corresponding to meeting permission or meeting refusal from the inspecting user terminal 6 and the portable authorizing user terminal 3, and when the meeting permission information indicates that the both parties are agreeable to the meeting, the location of the inspecting user terminal 6 may be transmitted to the authorizing user terminal 3, and the location of the portable authorizing user terminal 3 may also be transmitted to the inspecting user terminal 6. Thus, if the authorizing user and the inspecting user both wish to meet, the authorizing user and the inspecting user can each acquire the location of the other party. As a result, the authorizing user and the inspecting user can move to and meet with each other based on the location of the other party. If the meeting permission information received from the inspecting user terminal 6 and the portable authorizing user terminal 3 indicates that the meeting is possible, the meeting setting unit 26 may transmit a message to the portable authorizing user terminal 3 and the inspecting user terminal 6 indicating that the other party has agreed to the meeting.

According to the vehicle inspection authorization information management system 1 of the above embodiment, the inspecting user can use the inspecting user terminal 6 to obtain the parking time and parking position of the authorized vehicle 7, and inspect the authorized vehicle 7. As a result, the inspecting user is able to inspect the desired vehicle without visiting the dealership.

The parking information creation unit 21 creates parking information and sends this information to the authorized vehicle information creation unit 22 when a predetermined condition is met. In other words, when a predetermined condition is met, the parking information is automatically created and sent to the authorized vehicle information creation unit 22. The predetermined condition may be an occurrence of an even such as that the position of the authorized vehicle 7 does not change for a predetermined period of time, the connection between the charging connector 31 of the authorized vehicle 7 and the charging outlet of the charging station is detected, the vehicle is in a prescribed parking area, the navigation device 11 has set a route, a destination and a target arrival time, a charging station reservation designating a charging spot and a charging start time is confirmed and so on. As a result, the number of records of the authorized vehicle information included in the authorization information database 28 increases, and the chance for each inspecting user to find desired authorized vehicles 7 that match the inspecting user's preferences increases.

Furthermore, the parking information creation unit 21 can prohibit the creation of parking information and the transmission of parking information to the authorized vehicle information creation unit 22 depending on the operation of the portable authorizing user terminal 3 by the authorizing user. Therefore, the authorizing user can freely decide if the authorized vehicle 7 is to be offered for inspection or not.

The present invention has been described in terms of a specific embodiment, but is not limited by the illustrated embodiment, and can be modified in various ways without departing from the scope of the present invention. For example, the management server 2 may provide an incentive to the corresponding authorizing user each time the parking information creation unit 21 provides parking information to the authorized vehicle information creation unit 22. Thereby, the authorization of the authorized vehicle 7 by the authorizing user can be favorably encouraged.

Optionally, the authorized vehicle information creation unit 22 may increase the incentive when the parking information was created by the user and the difference between the time point of creating the parking information and the parking start time contained in the authorized vehicle information is equal to or greater than a prescribed determination value than when the difference is smaller than the prescribed value. The authorizing user may input parking information containing the future parking start time and parking position of the authorized vehicle into the portable authorizing user terminal 3. According to this aspect, more incentives can be given to authorizing users who input parking information well ahead of the parking start time. By encouraging the authorizing users to input the parking information at an earliest possible time points, the amount of the authorized vehicle information available to potential inspecting users can be increased.

The parking information creation unit 21 may be realized by the management server 2. In this case, the management server 2 preferably communicates with the portable authorizing user terminals 3 and the onboard authorizing user terminals 4 and collects information necessary for creating the parking information from the portable authorizing user terminals 3 and the onboard authorizing user terminals 4.

The vehicle inspection authorization information management system 1 according to the above embodiment is preferably installed with a program that executes the following vehicle inspection authorization methods.

The first program is configured to cause a computer to execute a vehicle inspection authorization method including the steps of creating parking information containing the current parking position of the authorized vehicle 7 or a future parking start time and the parking position; creating authorized vehicle information containing the vehicle information, parking position, parking start time and parking end time of the authorized vehicle 7 based on the parking information; and transmitting the authorized vehicle information to a user terminal possessed by a user who desires to inspect the authorized vehicle.

The second program is configured to cause a computer to execute a vehicle inspection authorization method including the steps of communicating with an inspecting user terminal of an inspecting user who desires to inspect an authorized vehicle to transmit authorized vehicle information containing a model, parking position and parking time of the authorized vehicle to the inspecting user terminal; and acquiring a position of the inspecting user terminal by communicating with the inspecting user terminal and transmitting a signal to the authorizing user terminal of the authorizing user who owns the authorizing vehicle to notify the authorizing user terminal that the inspecting user is located near the authorized vehicle if the distance between the position of the inspecting user terminal and the parking position is equal to or smaller than a determination value.

The third program is configured to cause a computer to execute a vehicle inspection authorization method including the steps of communicating with an inspecting user terminal of an inspecting user who desires to inspect an authorized vehicle to transmit authorized vehicle information containing a model, parking position and parking time of the authorized vehicle to the inspecting user terminal; acquiring a position of the inspecting user terminal by communicating with the inspecting user terminal to determine if the distance between the position of the inspecting user terminal and the parking position is equal to or smaller than a determination value; and notifying a photographing recommendation information for urging photographing of the authorized vehicle to the inspecting user terminal if the distance between the position of the inspecting user terminal and the parking position is equal to or smaller than the determination value.

The invention claimed is:

1. A vehicle inspection authorization information management system, comprising an authorized vehicle information creation unit, an inspecting user detection unit, an onboard authorizing user terminal, an authorizing user detection unit, and an action management unit which are formed by an information processing device including a processor and a nonvolatile memory, wherein the authorized vehicle information creation unit is configured to communicate with an inspecting user terminal possessed by an inspecting user who wishes to inspect an authorized vehicle to transmit vehicle information, a parking position, and a parking start time and end time of the authorized vehicle to the inspecting user terminal, the inspecting user detection unit is configured to communicate with the inspecting user terminal to acquire a location of the inspecting user terminal from the inspecting user terminal and notify that the inspecting user is located near the authorized vehicle by transmitting a signal to an authorizing user terminal possessed by an authorized user who owns the authorized vehicle when a distance between the location of the inspecting user terminal and the parking position is equal to or less than a determination value, the onboard authorizing user terminal is mounted on the authorized vehicle, the authorizing user detection unit is configured to communicate with the authorizing user terminal to acquire a position of the authorizing user terminal from the authorizing user terminal and when a distance between a position of the authorizing user terminal and the parking position is equal to or less than a determination value, the authorizing user detection unit transmits a signal to the onboard authorizing user terminal so as to cause the onboard authorizing user terminal to operate at least one of a lighting device, an audio output device and an air conditioner provided in the authorized vehicle based on this signal, and the action management unit communicates with the authorized vehicle and when a vibration sensor provided on the authorized vehicle has detected a vibration whose magnitude is equal to or higher than a threshold value, cause an onboard camera provided on the authorized vehicle to photograph a surrounding area of the authorized vehicle, and the threshold value is set lower when the distance between the location of the inspecting user terminal and the parking position is equal to or less than the determination value than when the distance between the location of the inspecting user terminal and the parking position is greater than the determination value.

2. The vehicle inspection authorization information management system according to claim 1, when the distance between the position of the authorizing user terminal and the parking position is equal to or less than a determination value, transmit a signal to the inspecting user terminal to notify the inspecting user terminal that the authorizing user is positioned near the authorized vehicle.

3. The vehicle inspection authorization information management system according to claim 2, further comprising a meeting setting unit formed by an information processing device including a processor and a nonvolatile memory, wherein the meeting setting unit is configured to receive meeting permission information corresponding to meeting permission or meeting refusal from the inspecting user terminal and the portable authorizing user terminal, and wherein a position of the inspecting user terminal is transmitted to the authorizing user terminal and a position of the authorizing user is transmitted to the inspecting user terminal when both parties are agreeable to a meeting.

4. The vehicle inspection authorization information management system according to claim 1, wherein the authorized vehicle information creation unit is configured to acquire a desired authorization period set by the authorizing user from the authorizing user terminal, create a revised authorization period by delaying the start time of the desired authorization period and advancing the end time of the desired authorization period and transmit the revised authorization period to the inspecting user terminal.

5. A method for vehicle inspection authorization information management, comprising the steps of communicating with an inspecting user terminal possessed by an inspecting user who desires to inspect an authorized vehicle to transmit vehicle information of the authorized vehicle containing vehicle information, a parking position, a parking start time, and a parking end time of the authorized vehicle to the inspecting user terminal, acquiring a position of the inspecting user terminal from the inspecting user terminal by communicating with the inspecting user terminal, a signal being transmitted to an authorizing user terminal possessed by an authorizing user who owns the authorized vehicle to notify a presence of the inspecting user near the authorized vehicle to the authorizing user when a distance between a position of the inspecting user terminal and the parking position is equal to or less than a determination value, communicating with an authorizing user terminal to acquire a position of the authorizing user terminal and when a distance between a position of the authorizing user terminal and the parking position is equal to or less than a determination value, transmitting a signal to an onboard authorizing user terminal mounted on the authorized vehicle, and causing the onboard authorizing user terminal to perform a notification by controlling at least one of a lighting device, an audio output device and an air conditioner provided in the authorized vehicle based on this signal, and communicating with the authorized vehicle and when a vibration sensor provided on the authorized vehicle has detected a vibration whose magnitude is equal to or higher than a threshold value, cause an onboard camera provided on the authorized vehicle to photograph a surrounding area of the authorized vehicle, and the threshold value is set lower when the distance between the location of the inspecting user terminal and the parking position is equal to or less than the determination value than when the distance between the location of the inspecting user terminal and the parking position is greater than the determination value.

6. A non-transitory computer-readable storage medium storing a program that causes a computer to execute a vehicle inspection authorization method including the steps of communicating with an inspecting user terminal possessed by an inspecting user who desires to inspect an authorized vehicle to transmit vehicle information of the authorized vehicle containing vehicle information, a parking position, a parking start time, and a parking end time of the authorized vehicle to the inspecting user terminal, acquiring a position of the inspecting user terminal from the inspecting user terminal by communicating with the inspecting user terminal, a signal being transmitted to an authorizing user terminal possessed by an authorizing user who owns the authorized vehicle to notify a presence of the inspecting user near the authorized vehicle to the authorizing user when a distance between a position of the inspecting user terminal and the parking position is equal to or less than a determination value, communicating with an authorizing user terminal to acquire a position of the authorizing user terminal and when a distance between a position of the authorizing user terminal and the parking position is equal to or less than a determination value, transmitting a signal to an onboard authorizing user terminal mounted on the authorized vehicle, and causing the onboard authorizing user terminal to perform a notification by controlling at least one of a lighting device, an audio output device and an air conditioner provided in the authorized vehicle based on this signal, and communicating with the authorized vehicle and when a vibration sensor provided on the authorized vehicle has detected a vibration whose magnitude is equal to or higher than a threshold value, cause an onboard camera provided on the authorized vehicle to photograph a surrounding area of the authorized vehicle, and the threshold value is set lower when the distance between the location of the inspecting user terminal and the parking position is equal to or less than the determination value than when the distance between the location of the inspecting user terminal and the parking position is greater than the determination value.

* * * * *